SHINGLE FILING AND RETRIEVAL SYSTEM

Filed Dec. 29, 1965 2 Sheets-Sheet 1

INVENTORS
JACK W. HILF
MAXINE E. WOODRUFF
Ernest S. Cohen
BY Gersten Sadowsky
ATTORNEYS

SHINGLE FILING AND RETRIEVAL SYSTEM

INVENTORS
JACK W. HILF
MAXINE E. WOODRUFF
Ernest S. Cohen
BY Gersten Sadowsky
ATTORNEYS United States Patent Office 3,371,322

Patented Feb. 27, 1968

3,371,322

SHINGLE FILING AND RETRIEVAL SYSTEM

Jack W. Hilf, Bethesda, Md., and Maxine E. Woodruff, Lakewood, Colo., assignors to the United States of America as represented by the Secretary of the Interior Filed Dec. 29, 1965, Ser. No. 517,492
7 Claims. (Cl. 340—172.5)

The invention relates to an information filing and retrieval arrangement wherein informational material recorded on storage members together with coded elements, identifying a part or parts of the material, is retrievable when the storage members are collated with respect to the arrangement's readout structure. Having special utility as the storage members of the present invention are file cards on which can be printed an informative abstract of a document such as a treatise, technical article, study, or report. Coded elements can be provided on these cards by punching or affixing characteristic marks, and printing indicia and guide lines thereon.

Provisions are made to collate the storage members on a plane surface displaying lines and other markings which guide the placement of the members into a predetermined relationship in respect to each other and a number of descriptive writings that are readable among the lines on the surface. When set in place on the surface the coded elements on one form of the storage members are in position to cooperate with delineator markings on other members and the writings on the collating surface whereby the informational contents of the members are identified. Also applicable in the present invention are coded elements for identifying the informational contents of storage members which function to adapt such members to relate to data on a collating surface independently of markings on any other members. The members are pivotally mounted on the collating surface in a shingled fashion so as to allow easy access to the informative material on both sides of any member.

An object of the present invention is therefore to provide a compact file conveniently maintaining a collection of information so as to allow rapid retrieval of specified items of such information.

A further object of the invention is to provide an augmentable record file wherefrom predetermined informational portions can be retrieved in an expeditious manner.

These and other objects and advantages of the present invention will become more fully apparent from the following detailed description of the invention set forth herein and from the accompanying drawing made a part hereof in which.

By way of explanation of the present invention reference is made to a selective dissemination of information system disclosed in an article by co-inventor Jack W. Hilf, entitled "Matching of Descriptors in a Selective Dissemination System," on pages 65 and 66 of a publication by the American Documentation Institute, relating to proceedings of its 26th annual meeting at Chicago, Ill., during October 1963. Disclosure of this article's system is made in terms of information pertaining to reclamation activities including the planning, research, designing, construction, and operation and maintenance of multiple purpose water resources projects. This information is derived from documents received as accessions to a central library. The substance of each of the documents is abstracted and the informational material thus prepared is printed on one side of a file card along with special indicia to be hereinafter more fully explained. On the reverse side of the card is printed information identifying the source of the document including a complete title thereof, and an analysis of the document's contents. Constituting this analysis are a group of keywords and phrases designated descriptors and identifiers which individually characterize one of the many different topics pertaining to the overall subject of the information under consideration. Space is also provided on the reverse side of the card to print the address of the party for whom the card is prepared.

Figure 1:
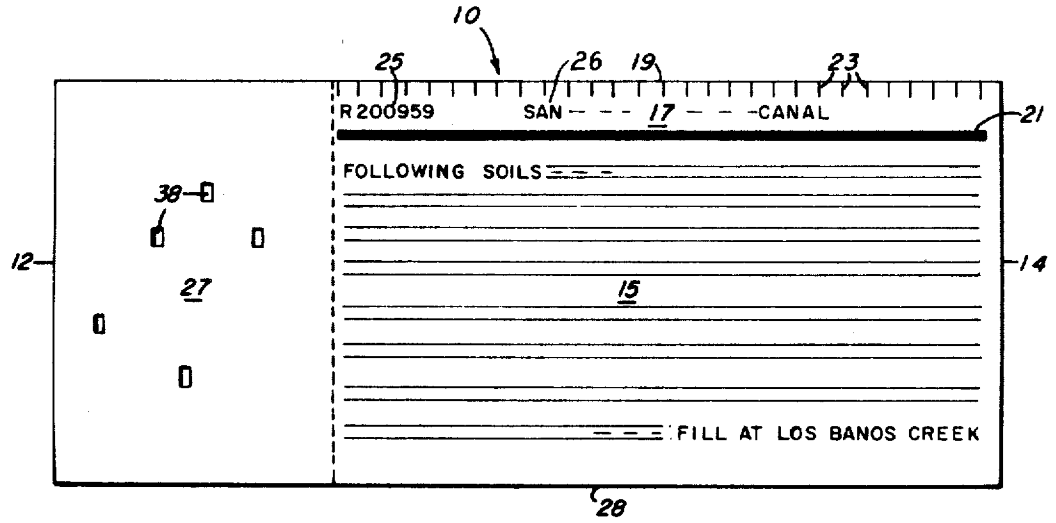
FIG. 1 shows the abstract side of a card information storage member.
Figure 2:
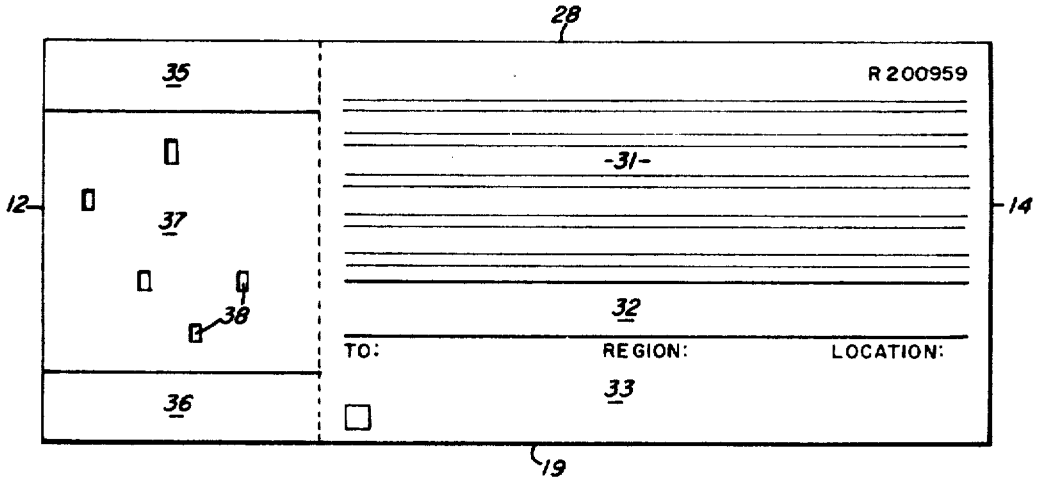
FIG. 2 shows the identification side of the card shown in FIG. 1.

Suggested for use as the storage members of the aforementioned informational dissemination system are file records in the nature of that shown in FIGS. 1 and 2, indicated by numeral 10. Such elements are made separable along a perforated line to provide a stub part 12, and an informational record card 14. Each document chosen for dissemination is abstracted to comprise a disclosure of about 220 words in length which is made to fit within an area 15 covering the greater part of one side of the record card. A marginal area 17 on the abstract side of the card extends across the top thereof contiguous to its upper edge 19, and is delineated from storage area 15 by a relatively thick darkly shaded line 21. Spread across the upper part of the marginal area is an array of vertical dash marks dividing this upper part into 27 equal spaces 23. Between spaces 23 and thick line 21 is printed a document number and a short title 26 for the abstracted document. Stub part 12, on its abstract side, carries a list of instructions 27 concerning the use and disposition of the stub.

Referring to FIG. 2, file record 10 is shown flipped over about a bottom edge 28 thereof, to present the record's opposite surface. This surface is constituted by areas 31, 32 and 33, on which are printed several kinds of identification material. Area 31 contains descriptors and subject identifiers which as hereinbefore explained are the keywords and phrases designating the subject matter of the related document whose number, full title, author and source are also given in the area. Area 33 provides space on which is printed the name and address of the recipient, and a document order check box. The title and origin of the dissemination system are recorded within area 32, and also on the upper portion 35 of stub 12, as a return address. An area 36 on the lower portion of stub 12 contains the recipient's identification, and an order box for the relevant document. A central area 37 on stub 12 is reserved for comments by the recipient.

A file record 10 relating to a particular document is sent from the central library to each member of a group selected from among a class of persons interested in obtaining information through the facilties of the system. To effectuate the selection indicated, each person of the class provides the central library with an interest profile. An exemplary interest profile is made up of from about 16 to 18 descriptors. Each document considered for dissemination is similarly indexed at the central library by an average of 20 descriptors. Prepared for use with an IBM 650 computer is an interest profile deck of about 12,000 punch cards against which the computer matches punch cards carrying descriptor data for 20 documents. It is obivous that use can be made of relatively simple manually manipulative comparing means to relate the document data cards to interest profile information as well as more complex means such as the Honeywell H–800 computer wherein 15,000 descriptors on magnetic tape are available for matching with cards having data for 50 documents. Since it is evident that all descriptors used in indexing documents and interest profiles are not of equal importance to the subject involved, the descriptors are weighted as to importance by the use of asterisks to identify the major descriptors of a recipient, or the important descriptors of any document. Accordingly, asterisks are also coded on the punch cards or on the magnetic tape in a conventional manner to appropriately weight the significant descriptors whereby they are operative factors in the matching process. Suitable criteria are adopted to properly select recipients for the diverse documents, which require the matching of at least one descriptor distinguished by an asterisk, or of at least three descriptors.

Instructions 27 on stub 12 direct the return of the stub in the event the recipient intends to retain the abstract for filing. When received at the central library a record is made on the stub, such as by punched holes 38, indicating on the stub the use of the abstract, and other data that may be derived from notations on the stub. Such records can thus be read out to cards keeping track of the dissemination for the purposes of evaluating the effectiveness of the system.

Figure 3:
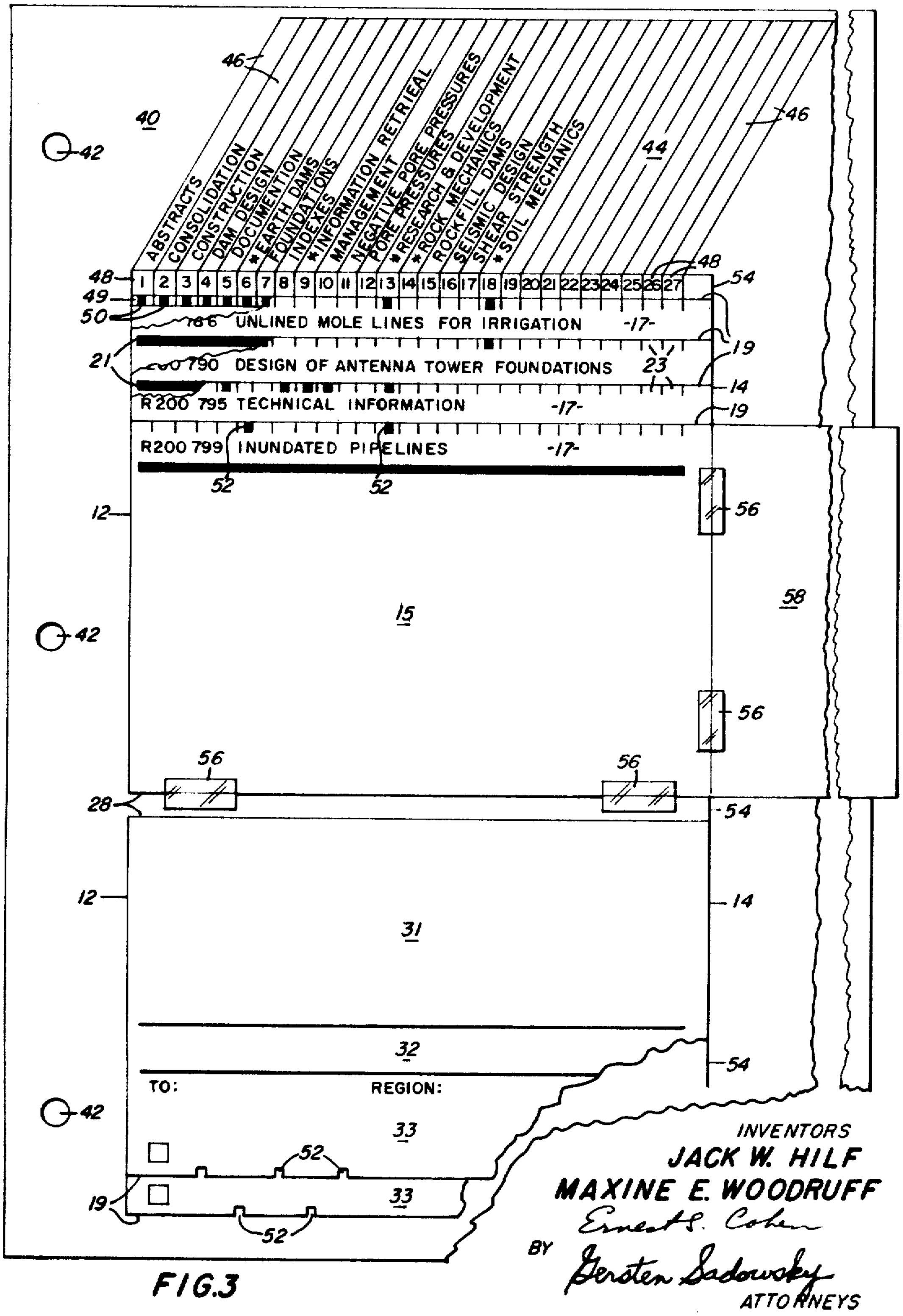
FIG. 3 is a showing, fragmentary in part, of a component unit of the overall filing and retrieval arrangement according to the present invention.

A unit of a storage and retrieval file according to the present invention as illustrated in FIG. 3 comprises a light card stock sheet 40 having guidelines and descriptive indicia printed thereon, and supporting information storage cards 14 in a predetermined relationship with respect to the printed matter on the sheet. Several holes 42 punched near the left edge of sheet 40 allow the units to be conveniently compiled in a looseleaf binder. Since each such compilation would ordinarily be maintained by a particular recipient of file records 10, the sheets 40 therefor are prepared to reflect such recipient's interest profile. Thus, each sheet 40 has printed across the upper portion thereof an inclined grid 44 providing upwardly extending narrow spaces 46 in which are printed the various descriptors and identifiers constituting the recipient's interest profile. Spaces 46 are designated by numbers in squares 48 arranged in a strip horizontally disposed across the bottom ends of spaces 46. For purposes to be hereinafter made more fully apparent, squares 48 are of such size as to correspond to spaces 23 set out in marginal area 17 of cards 14. Immediately below squares 48 is a relatively narrow strip 49 of contiguous squares 50, which are of such size and alignment as to position three of these squares under each of squares 48. The centrally disposed square 50 under each square 48 is shaded in the manner of dark line 21 on card 14.

As was hereinbefore explained, file records 10 are selected for dissemination by matching interest profile descriptors with those distinguishing the documents of interest. Contemporary with its selection for a recipient, each card, which after removal of a perforated strip becomes card 14 of a file record, is punched to indicate those descriptors which effected its selection. The removal of the perforated strip results in half-punches along the edge 19 of card 14. Such punches are evident in FIG. 3 as slit-like cut-outs 52 made in spaces 23 of card 14. It should be appreciated from the showing in FIG. 3 that cut-outs 52 can be appropriately located to indicate the requisite descriptors in the grid 44 where there is an alignment between spaces 23 on card 14, and squares 48 printed on sheet 40.

An accurate alignment of cards 14 on sheet 40 is facilitated by a guideline 54 shown in FIG. 3 extending vertically down, slightly to the right of grid 44. The first card 14 placed on a sheet 40 is located so as to align its right edge with line 54, and its top edge 19 with the upper border of strip 49. As a result, one of the strip's shaded squares 50 shows through each of the cut-outs 52 in card 14 whereby these exposed squares serve as distinctive markers beneath the numbers in squares 48 to designate the descriptors corresponding thereto. The second card 14 to be placed on sheet 40 is thereafter positionable to align its right edge with line 54 and its top edge 19 with the upper border of shaded line 21 on the card 14 first placed on the sheet. This line 21 is thereby adapted to function as a marker for all cut-outs 52 in the second card 14 since such cut-outs overlie the shaded area on the first card.

Similarly, each one of the other cards 14 thereafter added to sheet 40 is positioned to align its right edge with line 54, and its top edge 19 with the upper border of shaded line 21 on the card 14 next preceding it. By reason of this shingling of cards 14, the card first set down is very closely aligned with respect to spaces 46 printed on sheet 40 since its cut-outs are arranged to outline the precisely located shaded squares 50 printed on sheet 40. All cards 14 below the first will thus be accurately aligned with grid 44 since they are each guided into position by the shaded line 21 on the first and then the penultimate cards, as well as the line 54 printed on sheet 40.

Although cards 14 heretofore described as provided with cut-outs 52 and shaded lines 21 are preferable because of the ease and convenience with which they are applicable in the present invention, other cards, not so provided, but marked instead with shaded squares simulating the cut-outs, and like them aligned contiguous to edges 19 of such cards to indicate the cards' descriptors, are also advantageously useful in the invention. It is evident that cards 14 with shaded squares can be used exclusively to fill a sheet 40, or interfiled with cards having cut-outs 52. Where cut-outs 52 are backed-up by the surface of a card 14 lacking a shaded line 21, delineation for such cut-outs is obtained by merely shading in the spaces defined within the cut-outs. Accordingly, the over-all indicator display designating the pertinent indexing terms of cards 14 allocated to a sheet 40 does not differ to any significant extent whether cut-outs, shaded squares, or both are employed as coded elements on such cards.

Each card 14 is pivotally connected to sheet 40 by means of adhesive tabs 56 attached along bottom edge 28 of the card. These tabs function as hinges enabling any card 14 to be flipped around and down so as to expose the abstracted material on area 15 of the preceding card, as well as to show the identifying material on the reverse side of the card which was flipped. One or more additional cards 58, slightly reduced in size, can be attached by similar adhesive hinges to the right edge of any card 14, and arranged to lie flat on the reverse side of card 14, or be turned out to show diagrams and other material related to the card's abstract.

The disclosed arrangement constitutes a practical file for a multiplicity of miscellaneous abstracts wherein any one or more such abstracts pertaining to a particular subject can be quickly retrieved. The shingled stacking of cards 14 provides a view of all the marginal areas 17 on a sheet 40, whereby the abstract numbers and titles can be readily studied. Of particular advantage however is the intelligence gained from merely observing the delineated cut-outs 52 in their alignment with the descriptors in grid spaces 46. An inquiry as to the information available on a subject identified by any descriptor noted in grid 44 is quickly answered by merely glancing down from the descriptor's number in a square 48 to spot the document numbers and titles of those cards 14 having their easily distinguishable shaded cut-outs 52 aligned under such descriptor number. A more thorough consideration of the material thus uncovered can thereafter be made by flipping the cards and reading their abstracts.

Obviously other modifications and variations in the details of the present invention are possible in light of the disclosure herein. It is therefore understood that within the scope of the appended claims the invention may be practiced otherwise than as specifically described.

What is claimed is:

1. An information storage and retrieval file means comprising a base surface, an arrangement of guide and identification inscriptions on said surface including a grid of lines disposed across an upper part of said surface forming a horizontally extending row of enclosures framing individual ones of said identification inscriptions, a horizontally extending row of indicator figures immediately beneath said enclosures so as to relate a different one of said figures to each of said enclosures, a row of shaded markers uniformly spaced in a strip extending across said surface beneath said row of figures so as to center a separate one of said markers under each of said figures, and a said guide inscription extending away from a point adjacent to one side of said grid, and a multiplicity of storage elements which separately carry information relating to one of a multiplicity of concepts identified by said inscriptions, said elements being pivotally connected to said base and having side edges thereof aligned with said guide inscription, and an area on each said element defined contiguous to an upper edge thereof wherein said upper edge comprises concept designators which individually align with corresponding ones of said indicator figures related to said identification inscriptions.

2. The file of claim 1 wherein said storage elements are cards and said guide inscription is a vertically disposed line extending down from said point adjacent to one side of said grid whereby said side edges of said cards are aligned to said guide line.

3. The file of claim 1 wherein said area on each of said elements is defined between said upper edge of said element and a shaded thick line on the element situated above said information on said element, and said concept designators are cut-outs in said upper edge whereby a first of said elements is located on said base surface such that the cut-outs thereof fit around separate ones of said shaded markers and each of said subsequent cards is located to overlie said shaded thick line on a preceding card.

4. The file of claim 3 wherein said cut-outs in said upper edge of each said card are half-punches.

5. The file of claim 1 wherein a flipping of a said element about its connection to said base, exposes to view on the reverse side of the flipped card descriptive words and phrases relating to said information on said card, and which include one or more of said framed identification inscriptions.

6. The file of claim 1 wherein said area on each said element carries a title and identification number for the information on said card.

7. The file of claim 1 wherein further elements carrying additional information are pivotally attached to one side edge of an element pivotally connected to said base.

References Cited

UNITED STATES PATENTS

| | | | |
|---|---|---|---|
| 2,192,679 | 3/1940 | Kimball | 40—19.5 |
| 3,091,046 | 5/1963 | Engelstein et al. | 40—102 |
| 3,218,442 | 11/1965 | Waitman et al. | 235—61.12 |

PAUL J. HENON, *Primary Examiner.*

J. VANDENBURG, *Assistant Examiner.*